(12) United States Patent
Uno et al.

(10) Patent No.: US 7,498,052 B2
(45) Date of Patent: Mar. 3, 2009

(54) MEAT MODIFYING AGENT, METHOD OF PRODUCING MEAT PRODUCT AND MEAT PRODUCT

(75) Inventors: Minoru Uno, Gifu-ken (JP); Hisashi Uno, Gifu-ken (JP); Tsutomu Uno, Gifu-ken (JP); Tadashi Uno, Gifu-ken (JP); Shigenori Shimizu, Ogaki (JP)

(73) Assignee: Uno Shoyu Co., Ltd., Gifu (JP)

( * ) Notice: Subject to any disclaimer, the term of this patent is extended or adjusted under 35 U.S.C. 154(b) by 679 days.

(21) Appl. No.: 11/235,862

(22) Filed: Sep. 27, 2005

(65) Prior Publication Data

US 2006/0068077 A1    Mar. 30, 2006

Related U.S. Application Data

(63) Continuation of application No. PCT/JP2004/003394, filed on Mar. 15, 2004.

(30) Foreign Application Priority Data

Mar. 28, 2003    (JP)    ............... 2003-091606

(51) Int. Cl.
    *A23L 1/318*    (2006.01)
    *A23D 7/005*    (2006.01)

(52) U.S. Cl. .................. 426/602; 426/641; 426/281

(58) Field of Classification Search .............. 426/602, 426/641, 281
See application file for complete search history.

(56) References Cited

U.S. PATENT DOCUMENTS 5,039,538 A    8/1991    Tamaki et al. ............... 426/281
2003/0104110 A1 *   6/2003    Sikking et al. .............. 426/604

FOREIGN PATENT DOCUMENTS

| | | | |
|---|---|---|---|
| JP | 62-146584 | * | 6/1987 |
| JP | 02138933 | | 5/1990 |
| JP | 02227053 | | 9/1990 |
| JP | 02-227053 | * | 10/1990 |
| JP | 03-277251 | * | 12/1991 |
| JP | 412937 | | 3/1992 |
| JP | 530433 | | 5/1993 |
| JP | 779739 | | 3/1995 |
| JP | 7289155 | | 7/1995 |
| JP | 07-227248 | * | 8/1995 |
| JP | 771460 | | 8/1995 |
| JP | 866172 | | 3/1996 |
| JP | 8173096 | | 7/1996 |
| JP | 9220383 | | 8/1997 |
| JP | 11266835 | | 10/1999 |
| JP | 200069903 | | 3/2000 |
| JP | 2001292732 | | 10/2001 |

OTHER PUBLICATIONS

Taiwan IPO Search Report dated Jan. 26, 2007 based on Taiwan Patent Design Application No. 093107977.
Supplementary Search Report from corresponding EP 04 72 0704 dated Jun. 4, 2008.
International Search Report dated Jun. 22, 2004 from PCT Application No. PCT/JP2004/003395.
Explanation of Relevance by Suzuye & Suzuye dated Sep. 20, 2005—Ref. No. 04S0280P1.

* cited by examiner

*Primary Examiner*—Carolyn A Paden
(74) *Attorney, Agent, or Firm*—Ohlandt, Greeley, Ruggiero & Perle, L.L.P.

(57) ABSTRACT

A meat modifying agent includes an oil-in-water emulsion containing (A) 10 to 60 parts by weight of an animal fat/oil, (B) 0.01 to 1 part by weight of a starch, (C) 15 to 40 parts by weight of a saccharified starch, (D) 0.3 to 8.0 parts by weight of a non-ionic surfactant, (E) 0.41 to 7.5 parts by weight of a viscosity-increasing polysaccharide, (F) 0.02 to 0.05 parts by weight of an anti-oxidant, (G) 0.03 to 0.1 parts by weight of a metal sequestering agent, (H) 0.005 to 0.5 parts by weight of a pH adjusting agent, (I) a preservative containing 0.00001 to 0.005 parts by weight of thujaplicin, and (J) water.

12 Claims, No Drawings

MEAT MODIFYING AGENT, METHOD OF PRODUCING MEAT PRODUCT AND MEAT PRODUCT

CROSS-REFERENCE TO RELATED APPLICATIONS

This is a Continuation Application of PCT Application No. PCT/JP2004/03394, filed Mar. 15, 2004, which was published under PCT Article 21(2) in Japanese.

This application is based upon and claims the benefit of priority from prior Japanese Patent Application No. 2003-091606, filed Mar. 28, 2003, the entire contents of which are incorporated herein by reference.

BACKGROUND OF THE INVENTION

1. Field of the Invention

The present invention relates to a meat modifying agent, a method of producing a meat product and a meat product.

2. Description of the Related Art

With regard to meat, especially, beef and pork meats, a so-called marbled type, which has a high fat distribution rate, tends to be preferred. In order to obtain a marbled meat, beef cattle, horse, pork pig or the like are raised with not only a high-calorie feed, but also, in some trials, even an animal feed. Nevertheless, the cattle, horse, pig, etc., are originally herbivorous animals, and therefore they should be raised under the natural conditions according to the dispensation of nature. However, the meats obtained from the beef cattle, horse, pork pig and the like that are raised under the natural conditions have a low fat distribution rate.

There have been proposals to modify a piece of meat that has a low fat distribution rate into a quasi-marbled meat by injecting an emulsion of fat into the meat. For example, Jpn. Pat. Appln. KOKOKU Publication No. 4-12937 discloses a method of producing a quasi-marbled meat, in which an emulsion obtained by emulsifying fat with an aqueous solution of protein such as a heated whey protein or egg white is injected into a piece of meat, followed by freezing. Further, Jpn. Pat. Appln. KOKOKU Publication No. 5-30433 discloses a method of producing a quasi-marbled meat, in which an emulsion of fat that contains chitosan is injected into a piece of meat. Furthermore, Jpn. Pat. Appln. KOKOKU Publication No. 7-71460 discloses a method of producing a quasi-marbled meat, in which an emulsion of fat that obtained by using caseinate, skimmed milk powder, vegetable protein or the like is injected, as an emulsifier, into a piece of meat.

Needless to mention, it is desired that a meat that has been modified into a quasi-marbled state by the injection of a fat emulsion should exhibit similar conditions and taste to those of a natural marbled meat not only before but also after being cooked. Meanwhile, such a modified meat is frozen for storage as in the case of the natural marbled meat. Here, it is further desired that such a modified meat should have an excellent non-thawing cooking property, that it can exhibit similar conditions and taste of a natural marbled meat even if it is cooked without being thawed.

Thus, an object of the present invention is to provide a meat modifying agent that can produce a modified meat that exhibit similar conditions, taste and mouthfeel to those of a natural marbled meat and has an excellent no-thawing cooking property not only before but also after the meat is cooked.

Other objects of the present invention are to provide a method of preparing a modified meat using such meat modifying agent, as well as to provide a modified meat product.

BRIEF SUMMARY OF THE INVENTION

The inventors of the present invention considered that it would be best, in terms of food safety and hygiene, to modify a meat (into a marbled tinge) using fat/oil originated from animal, which is a supply source of meat, and studied about the emulsification of animal fat/oil so that it can be injected into a piece of meat. The emulsion must be excellent not only in storage stability but also in antibacterial property because it is used for raw meat. Therefore, the inventors studied along also from this point of view and made intensive researches. Eventually, they have found that a meat modifying agent containing animal fat/oil that cannot be achieved with the conventional technique can be obtained in the form of an oil-in-water emulsion, by adding a specified emulsifier (surfactant), an antibacterial agent and other components to the animal fat/oil and emulsifying them with water. The present invention is based on this finding. It has been further found that not only a meat processed with the meat modifying agent of the present invention is modified into a quasi-marbled meat, but also it can be roasted and cooked directly while it is frozen, without having to thawing, it in a similar manner to that of an ordinary chilled meat (meat preserved at a temperature of 5° C. or lower without being frozen).

Thus, according to a first aspect of the present invention, there is provided a meat modifying agent comprising an oil-in-water emulsion containing: (A) 10 to 60 parts by weight of an animal fat/oil; (B) 0.01 to 1 part by weight of a starch; (C) 15 to 40 parts by weight of a saccharified starch; (D) 0.3 to 8.0 parts by weight of a non-ionic surfactant; (E) 0.41 to 7.5 parts by weight of a viscosity-increasing polysaccharide; (F) 0.02 to 0.05 parts by weight of an anti-oxidant; (G) 0.03 to 0.1 parts by weight of a metal sequestering agent; (H) 0.005 to 0.5 parts by weight of a pH adjusting agent; (I) a preservative containing 0.00001 to 0.005 parts by weight of thujaplicin; and (J) water.

Further, according to a second aspect of the present invention, there is provided a method of producing a quasi-natural marbled meat product, characterized by injecting the meat modifying agent of the present invention into a meat and then subjecting it to a tumbling treatment.

Furthermore, according to a third aspect of the present invention, there is provided a meat product characterized by comprising the meat modifying agent of the present invention.

DETAILED DESCRIPTION OF THE INVENTION

The present invention will now be described in more detail.

The meat modifying agent of the present invention comprises an oil-in-water (O/W) type emulsion containing: (A) an animal fat/oil; (B) a starch; (C) a saccharified starch; (D) a non-ionic surfactant; (E) a viscosity-increasing polysaccharide; (F) an anti-oxidant; (G) a metal sequestering agent; (H) a pH adjusting agent; (I) a preservative containing thujaplicin; and (J) water. These components will be explained below.

Component (A): Animal Fat/Oil

The O/W type emulsion that constitutes the meat modifying agent of the present invention contains animal fat/oil. Needless to say, animal fat/oil is a fat/oil originated from animals such as beef cattle, pork pig and horse, and its main component is a triglyceride of a higher fatty acid. The animal fat/oil used in the present invention may be of an unpurified or purified type, but it is preferable that it has been subjected to heat in view of food hygiene.

Examples of the animal fat/oil are a JIS-specified beef fat/oil (having a specific gravity of 0.88 (at 60° C.), an acid value of 0.3 or lower, an iodine value of 55 to 70, and a saponification value of 190 to 200), and a JIS-specified pork fat/oil (having a specific gravity of 0.88 (at 60° C.), an acid value of 0.3 or lower, an iodine value of 55 to 70, a saponification value of 190 to 200 and a Bomer number of 70 or higher). It is also possible to use an adjusted fat/oil in which animal fats/oils are blended to have an iodine value of 52 to 72, a saponification value of 190 to 200, an acid value of 0.3 or lower, a melting point of 43° C. or lower and a specific gravity of 0.88 (at 60° C.).

In view of high flavor and hygiene, particularly preferable animal fat/oil used in the present invention are purified beef tallow, purified lard and purified horse oil. The purified beef tallow preferably has a melting point of 39° C. to 43° C. or less, an acid value of 0.3 or lower, a peroxide value of 0.5 or less, an iodine value of 51 or lower, a saponification value of 190 to 200 or lower and a Lovibond R0.6/Y6.0 or less. The purified lard preferably has a melting point of 38° C. or less 43° C. or less, an acid value of 0.3 or lower, a peroxide value of 0.5 or less, an iodine value of 55 to 70 or lower, a saponification value of 190 to 200 or lower and 70 or higher and a Lovibond 10R+Y=20 or lower.

Component (B): Starch

The starch forms a body structure of the O/W type emulsion that constitutes the meat modifying agent of the present invention. Examples of the starch are corn starch, potato starch and flour starch. In some cases, rice starch can be used as well.

The starch used in the present invention includes denatured starch such as a-starch, acid-treated starch, grafted starch or cross-linked starch.

Component (C): Saccharified Starch

Examples of the saccharified starch are reducing saccharified starch, starch syrup, an oligosaccharide and D-sorbitol.

The reducing saccharified starch is a colorless transparent syrup-like liquid, and preferably has a solid content of 70.0% or more, a sugar alcohol of 53.0% or more, a reducing sugar (as glucose) of 0.5% or less and a pH of 5.0 to 7.0. The starch syrup is a colorless and transparent liquid having a high viscosity, and preferably has a solid content of 70.0% or more, a direct reducing sugar of 31.5% or more and DE (dextrose equivalent) of 43.0 or more. D-sorbitol is a colorless and transparent syrup liquid that is designated as a food additive, and preferably has a D-sorbit of 70% or more, a reducing sugar (as glucose) of 0.5% or less and a saccharide (as glucose) of 6 to 8%. These saccharified starches may be of those commercially available.

As the saccharified starch, the reducing saccharified starch and starch syrup are particularly preferable since they are excellent in terms of antibacterial property, low sweetness and foaming inhibiting property.

Component (D) Non-Ionic Surfactant

The non-ionic surfactant is used to emulsify animal fat/oil into an aqueous phase, and use may be made of glycerin fatty acid ester, sucrose fatty acid ester, sorbitan fatty acid ester, propylene glycol fatty acid ester, as well as natural lecithin and saponin. AS the non-ionic surfactant, glycerin fatty acid ester, sucrose fatty acid ester, lecithin and saponin are particularly preferred. These non-ionic surfactants may be of those commercially available.

The glycerin fatty acid ester includes a monoester, a diester, a triester or a mixture of these. Alternatively, monoesters may be polymerized at the glycol moieties to make them into a polyglycol to be used as the glycerin fatty acid ester. The fatty acid moiety of the glycerin fatty acid ester includes a saturated fatty acid and an unsaturated fatty acid, and either one can be used. As the glycerin fatty acid ester, a liquid type that has an HLB value of 3 to 4 is preferable.

The sucrose fatty acid ester includes a sucrose fatty acid monoester with one molecule of fatty acid attached to one molecule of sucrose, a diester with two molecules of fatty acid attached to one molecule of sucrose, and a triester with three molecules of fatty acid attached to one molecule of sucrose. Theoretically, up to an octaester having eight molecules of fatty acid attached to one molecule of sucrose may exist. However, those which are suitable for food are a monoester, diester and triester. As the sucrose fatty acid ester, a sucrose fatty acid monoester having an HLB value of 19 is particularly preferable in view of the stability of emulsion. On the other hand, in view of the reduction of the cost for the emulsion, it is preferable that a mixture of monoester, diester and triester (to be called as sucrose fatty acid mixed ester hereinafter) be used, and in particular, a mixture of sucrose fatty acid mixed ester having an HLB value of 14 to 16 and sucrose fatty acid monoester is used.

Example of lecithin are plant lecithin, fractioned lecithin, egg yolk lecithin, enzyme-treated lecithin, enzyme-decomposed lecithin. As the food additive, the use of lecithin is not limited. Of these examples, plant lecithin having an HLB value of 3 to 4 is preferable.

Examples of saponin are quillaia saponin, soybean saponin and tea saponin. As an additive originated from natural substances, the use of saponin is permitted. Saponin has an excellent surface activating effect. Of these examples, quillaia saponin is preferable.

Component (E): Viscosity-Increasing Polysaccharide

Examples of the viscosity-increasing polysaccharide, which can be effectively used to impart the viscosity increasing effect, are gummy materials such as xanthane gum, guar gum, carrageenan (kappa type, iota type or non-gelled lambda type), and psyllium. In view of hygiene, it is particularly preferable that these viscosity-increasing polysaccharides are sterilized in advance. It should be noted that when xanthane gum is used in combination with guar gum, or when psyllium is used in combination with xanthane gum or guar gum, the viscosity increasing effect is synergistically improved.

Component (F): Anti-Oxidant

The anti-oxidant is used to impart an anti-oxidation property to the O/W type emulsion that constitutes the meat modifying agent of the present invention. Examples of the anti-oxidant are a tocopherol (vitamin E) such as d-α-tocopherol, ascorbyl stearate and ascorbyl palmitate. Ascorbyl stearate or ascorbyl palmitate, when it is used in combination with an organic acid such as citric acid, which is used as the metal sequestering agent which will be described later in detail, synergistically improves its anti-oxidation ability. Alternatively, tocopherol and ascorbyl stearate and/or ascorbyl palmitate, when they are heated and melted together, further improve their anti-oxidation effects.

Component (G): Metal Sequestering Agent (Metal Chelating Agent)

The metal sequestering agent is used to chelate metal ions that may be contained in the O/W emulsion of the present invention to trap them for stabilization. Usable examples of the metal sequestering agent are phytic acid, citric acid, ascorbic acid (especially, L-ascorbic acid), and polyphosphate salt (such as tetrapotassium pyrophosphate, sodium dihydrogen pyrophosphate, tetrasodium pyrophosphate, potassium polyphosphate, sodium polyphosphate, potassium metaphosphate and sodium metaphosphate).

Component (H): pH Adjusting Agent

Examples of the pH adjusting agent, which is used to adjust the pH value, are L-ascorbic acid, sodium L-ascorbate and citric acid. The meat modifying agent of the present invention usually has a pH value of 2.5 to 3.0.

Component (I): Preservative Containing Thujaplicin

Thujaplicin (isopropyltropolone) is blended as an effective component of the preservative to the O/W type emulsion that forms the meat modifying agent of the present invention. A preferable example of thujaplicin is naturally originated β-thujaplicin (4-isopropyltropolone).

Thujaplicin has a sublimating property and therefore it is preferable in order to be able to exhibit its effect of the preservative for a long time that thujaplicin is enclosed or clathrated in cyclodextrin. In this case, it is particularly preferable that thujaplicin is dissolved in ethanol and thus obtained ethanol solution is included in cyclodextrin. A preferable example of cyclodextrin is β-cyclodextrin.

Component (J): Water

Water forms the continuous phase of the O/W type emulsion of the meat modifying agent of the present invention, and any one of distilled water, purified water, ion-exchanged soft water, regular tap water, etc.

<Composition of the O/W Type Emulsion>

Next, the composition of the O/W type emulsion that forms the meat modifying agent of the present invention will now be described. It should be noted that the amount of each of the components that will be indicated below is a preferable amount for exhibiting its individual performance, unless otherwise indicated. The lower limit indicates a minimum amount preferable for a respective component to exhibit its performance, and the upper limit is set mainly for the economical reason.

It is preferable that the animal fat/oil (A) is blended in an amount of 10 to 60 parts by weight in the O/W type emulsion of the present invention. If the amount of the animal fat/oil (A) is less than 10 parts by weight, the orientation rate of the fat/oil with respect to the cell wall of the meat is decreased, and therefore there may be a tendency that meat that is sufficiently marbled artificially cannot be obtained. On the other hand, if the amount of the animal fat/oil (A) exceeds 60 parts by weight, there is a tendency that the fat/oil component becomes excessive. It is more preferable that the animal fat/oil (A) is blended in an amount of 20 to 45 parts by weight.

It is preferable that the starch (B) is blended in an amount of 0.01 to 1 parts by weight.

It is preferable that the saccharifed starch (C) is blended in an amount of 15 to 40 parts by weight.

It is preferable that the non-ionic surfactant (D) is blended in an amount of 0.3 to 8.0 parts by weight. If the amount of the non-ionic surfactant exceeds 8.0 parts by weight, the smell of the non-ionic surfactant may become intolerable. Of the ionic-surfactants, it is particularly preferable that glycerin fatty acid ester is blended in an amount of 0.1 to 0.4 parts by weight, and it is even more preferable that it is blended in an amount of 0.1 to 0.3 parts by weight. Meanwhile, it is particularly preferable that sucrose fatty acid ester is blended in an amount of 0.2 to 0.5 parts by weight, and it is even more preferable that it is blended in an amount of 0.2 to 0.4 parts by weight. Further, in view of the cost, it is preferable as sucrose fatty acid ester that 0.1 to 0.2 parts by weight of monoester (having a purity of substantially 100%) and 0.2 to 0.5 parts by weight of sucrose fatty acid mixed ester is used as they are blended at this ratio, or 0.08 to 0.1 part by weight of monoester (having a purity of substantially 100%) and 0.12 to 0.2 parts by weight of sucrose fatty acid mixed ester is used as they are blended at this ratio. Further, it is preferable that lecithin is blended in an amount of 0.1 to 5.0 parts by weight, and more preferably in an amount of 0.1 to 3.5 parts by weight. Further, it is preferable that quillaia saponin is blended in an amount of 0.5 to 5.0 parts by weight, and more preferably in an amount of 0.5 to 4.0 parts by weight. It should be noted here that when a particular amount used within a blending amount range specified for each and individual non-ionic surfactant is less than the amount of use of the above-specified non-ionic surfactant, some other non-ionic surfactant can be used in compensation for the shortage.

It is preferable that the viscosity-increasing polysaccharide (E) is blended in an amount of 0.41 to 7.5 parts by weight.

It is preferable that the anti-oxidant (F) is blended in an amount of 0.02 to 0.05 parts by weight. Of the anti-oxidants mentioned above, it is particularly preferable that tocopherol (vitamin E), especially, is blended in an amount of 0.02 to 0.05 parts by weight. In the case of ascorbyl stearate or ascorbyl palmitate, it is particularly preferable that it is blended in an amount of 0.02 to 0.03 parts by weight.

It is preferable that the metal sequestering agent (metal chelating agent) (G) is blended in an amount of 0.03 to 0.1 parts by weight. Of the metal sequestering agents mentioned above, it is particularly preferable that phytic acid, especially, is blended in an amount of 0.03 to 0.08 parts by weight.

It is preferable that the pH adjusting agent (H) is blended in an amount of 0.005 to 0.5 parts by weight. Of the pH adjusting agents mentioned above, it is particularly preferable that sodium L-ascorbate, especially, is blended in an amount of 0.005 to 0.03 parts by weight, and even more preferably, in an amount of 0.005 to 0.02 parts by weight. Meanwhile, in the case of citric acid, it is particularly preferable that it is blended in an amount of 0.005 to 0.03 parts by weight, and even more preferably, in an amount of 0.005 to 0.02 parts by weight.

Thujaplicin, which is the effective component of the preservative (I), should preferably be blended in an amount of 0.00001 to 0.005 parts by weight, and more preferably, in an amount of 0.00001 to 0.004 parts by weight.

As described above, when an ethanol solution of thujaplicin is included in cyclodextrin, it is preferable that 0.00001 to 0.005 parts by weight of thujaplicin are dissolved into 0.01 to 1 part by weight of ethanol, and thus obtained ethanol solution of thujaplicin is included in 0.3 to 3 parts by weight of cyclodextrin. In this case, it is particularly preferable that ethanol is blended in an amount of 0.01 to 0.8 parts by weight, and β-cyclodextrin is blended in an amount of 0.3 to 2.5 parts by weight.

In the case where the meat modifying agent of the present invention is to be provided in the form of a relatively dense emulsion, water (J) is blended in an amount of 25 to 45 parts by weight, and more preferably in an amount of 25 to 35 parts by weight.

The O/W type emulsion that forms the meat modifying agent of the present invention can be manufactured in various ways. Nevertheless, it is preferable that a water phase mixture (a), an oil phase mixture (b) and a preservative mixture (c) that contains thujaplicin is prepared each separately, and then these mixtures (a) to (c) are stirred to prepare the emulsion.

The water phase mixture (a) can be prepared by mixing the starch (B), saccharified starch (C), non-ionic surfactant (D), viscosity-increasing polysaccharide (E), metal sequestering agent (G), pH adjusting agent (H) and water (J) together. During the preparation, they can be mixed at a temperature of 95° C. to 100° C.

The oil phase mixture (b) can be prepared by mixing the animal fat/oil (A) and anti-oxidant (F) together. During the preparation, they can be mixed at a temperature of 110° C. to 120° C.

As described above, the preservative mixture (c) can be prepared by dissolving thujaplicin into ethanol and adding cyclodextrin to thus obtained ethanol solution, followed by mixing. During the preparation, they can be mixed at a temperature of 15° C. to 40° C.

While thus prepared water phase mixture (a) is being stirred, the oil phase mixture (b) is gradually added thereto to emulsify the oil phase mixture, giving an O/W type emulsion. It should be noted that the stirring is preferably carried out while the water phase mixture (a) is cooled down to 50° C. to 40° C. Then, the preservative mixture (c) is added to thus obtained O/W type emulsion and the mixture is further stirred. Thus, a meat modifying agent made of a desired O/W type emulsion can be prepared.

The O/W type emulsion that forms the meat modifying agent of the present invention can be prepared in the form of a relatively dense O/W type emulsion, which is convenient for production, when the amount of water (J) used to prepare the water phase mixture is adjusted to 25 to 45 parts by weight, or preferably 25 to 35. In this case, the animal fat/oil (A), starch (B), saccharified starch (C), non-ionic surfactant (D), viscosity-increasing polysaccharide (E), anti-oxidant (F), metal sequestering agent (G), pH adjusting agent (H), preservative (I) (thujaplicin+ethanol+cyclodextrin) and water (J) are each used in the above-described amount. Here, it is preferable that each of these components is used at such a rate that the total amount of these component becomes 100 parts by weight.

The thus obtained dense emulsion is not destroyed even if it is diluted with additional water and therefore it is stable. For example, the emulsion can be diluted with water in amount of up to 1.3 times as much as the weight of the thick emulsion. An emulsion thus diluted with additional water can be used as the meat modifying agent of the present invention.

Regarding the O/W type emulsion of the meat modifying agent according to the present invention, the average diameter of its oil drops is preferably 0.5 to 5 μm, and more preferably 0.5 to 2 μm. Such fine oil droplets can be obtained by emulsifying the oil phase mixture (b) into the water phase mixture (a) with use of, for example, an ultra-high speed stirrer agitator capable of achieving a fluid flow speed of 30 m/sec to 55 m/sec (for example, a stirrer having an impeller rotation number of 7,200 rpm to 30,000 rpm) and/or an ultra-high pressure emulsifier having a jet stream output of 1,350 km/h to 3,100 km/h upon pressurization (1,500 kg/m² to 5,000 kg/m²) by pneumatic conveying by a high pressure plunger pump. After the addition of the preservative mixture (c), a similar emulsification process can be further carried out. By adjusting the stirring speed, stirring time, etc. in the emulsification process, an O/W type emulsion having a desired size of oil droplets can be obtained.

In order to produce a quasi-naturally marbled meat product according to the present invention, the meat modifying agent of the present invention is injected into a piece of meat and then the meat is subjected to a massage treatment.

In the injection of the meat modifying agent, an injection machine that is ordinarily used for processing meat can be used at an injection pressure of, for example, 2 to 3 kg/m². Then, the modifier-injected meat is subjected to the massage treatment using, for example, a vacuum tumbler.

The muscle tissue of meat has the following structure. That is, about 50 to 150 of muscle fibers, which correspond to cells, are bundled with a thin membrane to form a primary muscle bundle, and several tens of such first muscle bundles are further bundled with a slightly thicker membrane to form a secondary bundle. Furthermore, a great number of such secondary bundles are bundled with a strong membrane to form a muscle. The membranes used to bundle the primary and secondary bundles are called perimysium internum, and the outermost membrane of a muscle is called perimysium externum (epimysium). Both of them are made of connective tissues. The primary bundle thin membrane is called perimysium and myofibrils are arranged in parallel to each other along a longitudinal axis to exhibit striations. Further, a small number of nuclei, mitochondria, inner texture, sarcoplasmic reticula, etc. exist on an inner side of the perimysium and between muscle fibers and the gaps are filled with sarcoplasm. A myofibril is a slim fiber having a diameter of 0.5 to 2 μm. The sarcoplasm is also called colloidal solution. In the sarcoplasm, myogen, globulin X, hemoglobin, myoglobin that contains a number of proteins, various types of enzymes including phosphotransferase, nuclei, sarcosome, microsome, etc. are present. The sarcoplasm is distributed in a dendritic manner between a great number of bundles of myofibrillar tissues that are mainly contained in red muscle, and a corn-like pattern, which is called Cohnheim's area, can be observed in a cross sectional surface of the muscle fibers. The sarcoplasms have such characteristics that they bond together in a fabric or granular manner by heat or the like, and when this phenomenon occurs, water content flows out to form drip. It should be noted that in a ripened piece of meat, which is several days old after being slaughtered, a part of the internal structure of the myofibrils is broken, and the sarcoplasms can easily move and therefore penetrate out through the perimysium and gather to form a juice, which flow out as a reddish row drip.

The O/W type emulsion that forms the meat modifying agent of the present invention, especially, the type having a very fine oil droplets as described above, is jet-injected into a piece of meat through a injection needle at an injection pressure of 2 to 3 kg/m² using an injection machine. Then, the emulsion is put with pressure into the Cohnheim's structure, which is the body structural pattern of the sacroplasm (colloidal solution) existing between myofibrils of the muscles, and thereby orientated. In this manner, the myogen, globulin X, hemoglobin, myoglobin, glycogen, etc. contained in the sacroplasm are forcibly emulsified. Then, due to the reaction with various types of enzymes, the sacroplasm is set stable within the structure as it forms a spherical or fibrous shape. Thus, the free water contained in the sacroplasm becomes stable, thereby preventing the flow out of the drip. The meat modifying agent flows with pressure into the perimysium internum and perimysium externum, and then it is orientated. Thus, the reddish meat Cohnheim's pattern forms a pattern that resembles that of the naturally marbled meat.

A modified meat that has been subjected to the tumbler massage treatment can be quickly frozen (at −40° C., for example) after the shape of the meat is adjusted. After the completion of the freezing, the meat can be cut into pieces of such sizes for necessary amounts for cooking, and continuously, the pieces can be vacuum-packed to be stored in a freezer at −35° C. to −40° C. Then, when a general consumer purchases such a frozen modified meat product, the purchased meat product can be stored in the freezing compartment of a domestic refrigerator at, for example, −15° C.

The frozen modified meat product of the present invention can be cooked without being thawed. For example, 200 g of the frozen steak meat of the present invention requires 5 to 7 minutes to be roasted, and the time required is the same as the roasting time for a regular chilled steak. During this cooking without thawing, substantially no meat juice (drip) leaks from the modified meat of the present invention or the meat does not shrink. Further, the modified meat of the present invention has not only an excellent property in the softness of the meat texture when it is cooked by roasting, but also it retains the softness even when it cools down as being let stand after it was cooked. Furthermore, when the meat is heated once again after cooled down, a sufficient softness of the meat texture can be assured.

There is no particular limitation for the type of the meat to be modified by the present invention. Not only the domestic meats (beef, pork, horse meat), but also the meats imported from foreign countries, many of which are reddish meats (that is, for example, beefs from North America, South America, Australia and New Zealand) can be used for the present invention. Of the imported beefs, in particular, grass rods, which are raised by feeding grass have a grassy smell particular to pasture and therefore the quality grades as the edible meats are low. However, with the present invention, not only these grass rods can be modified into quasi-marbled meat but also the grassy smell particular to the grass rods is erased, and a flavor closer to the smell of raw meat of grain rods can be obtained. Further, there is no particular limitation for the part of the body from which the meat is taken. That is, the low-grade part such as a reddish part can be modified into a quasi-marbled meat to obtain a taste, flavor and softness of a naturally marbled meat. Not only that, high grade parts such as striploin, cube roll, tenderloin and shoulder-loin can be modified into pieces that have a taste, flavor and softness of even a higher grade meat.

The present invention will now be described with reference to examples, but the invention is not limited to these examples.

EXAMPLE 1

(I) Preparation of Water Phase Mixture (a):

0.25 parts by weight of corn starch, 0.2 parts by weight of xanthane gum, 0.15 parts by weight of guar gum, 0.1 part by weight of carrageenan, 24.3 parts by weight of reducing saccharified starch, 0.01 part by weight of citric acid, 0.01 part by weight of sodium L-ascorbate, 0.2 parts by weight of glycerin fatty acid ester (having an HLB value of 3 to 4), 0.1 part by weight of sucrose fatty acid monoester (having a monoester purity of 100% and an HLB value of 19), 0.3 parts by weight of sucrose fatty acid mixed ester (having an HLB value of 14 to 16), 0.3 parts by weight of enzyme breaking soybean lecithin, 43.3959 parts by weight of water and 0.008 0.2 parts by weight of phytic acid were mixed together and dissolved while being sterilized at 100° C. The solution was then cooled down to 40° C. or lower while preventing general viable cells such as floating bacteria from mixing into the solution. Thus, a desired water phase mixture (a) was prepared.

(II) Preparation of Oil Phase Mixture (b):

15 parts by weight of purified beef tallow, 15 parts by weight of purified lard, 0.02 parts by weight of d-α-tocopherol and 0.006 parts by weight of L-ascorbyl stearate were mixed together and dissolved at 120° C. Thus, a desired oil phase mixture (b) was prepared.

(III) Preparation of Preservative Mixture (c):

0.0001 part by weight of β-thujaplicin was mixed and dissolved into 0.05 parts by weight of ethanol (having a purity of 99.5%) at room temperature and thus an ethanol solution of thujaplicin was obtained. Then, in a sealed container, 0.3 parts by weight of β-cyclodextrin was added to the ethanol solution of thujaplicin and the solution was mixed at room temperature. Thus, a preservative mixture (c) was prepared.

(IV) Preparation of Meat Modifier

With use of a homogenizer (TK thin film revolution type high-speed mixer FM-80-100 model of Tokushu Kika Kogyo Kabushiki Kaisha), while the above-described water phase mixture (a) was being stirred, the oil phase mixture (b) was gradually added thereto. During this addition, the mixture was cooled down to 40° C. The stirring was carried out for 1 hour and thus an O/W type emulsion was obtained. Subsequently, the preservative mixture (c) was added to this O/W type emulsion. Further, while maintaining the temperature at 40° C. or less, the emulsion was stirred for 30 minutes, and thus a desired meat modifying agent was obtained. The composition of this meat modifying agent is indicated in TABLE 1.

EXAMPLES 2 AND 3

In a similar manner to that of Example 1, meat modifying agents were prepared, having compositions indicated in TABLE 1.

EXAMPLE 4

0.4 parts by weight of corn starch, 1.0 part by weight of xanthane gum, 0.15 parts by weight of guar gum, 5.0 part by weight of psyllium husk, 15.0 parts by weight of reducing saccharified starch, 0.01 part by weight of citric acid, 0.01 part by weight of sodium L-ascorbate, 3.5 parts by weight of enzyme breaking soybean lecithin, 36.6959 parts by weight of water and 0.008 0.2 parts by weight of phytic acid were mixed together and dissolved while being sterilized at 100° C. The solution was then cooled down to 40° C. or lower while preventing general viable cells such as floating bacteria from mixing into the solution. Thus, a desired water phase mixture was prepared.

With use of thus obtained water phase mixture, and an oil phase mixture (b) and preservative mixture (c) prepared in a similar manner to that of Example 1, a desired meat modifying agent was obtained in a similar manner to that of Example 1. The composition of this meat modifying agent is indicated in TABLE 1.

TABLE 1

Composition of Meat Modifier

| | Composition (parts by weight) | | | |
|---|---|---|---|---|
| Components | Ex. 1 | Ex. 2 | Ex. 3 | Ex. 4 |
| (A) Purified beef tallow | 15.0 | 10.0 | 15.0 | 15.0 |
| Purified lard | 15.0 | 25.0 | 25.0 | 15.0 |
| (B) Corn starch | 0.25 | 0.3 | 0.4 | 0.4 |
| (C) Reducing saccharified starch | 24.3 | 27.6 | 29.7 | 15.0 |
| (D) Glycerin fatty acid ester | 0.2 | 0.15 | 0.25 | — |
| Sucrose fatty acid monoester | 0.1 | 0.1 | 0.08 | — |
| Sucrose fatty acid | 0.3 | 0.3 | 0.12 | — |

TABLE 1-continued

Composition of Meat Modifier

| | Composition (parts by weight) | | | |
|---|---|---|---|---|
| Components | Ex. 1 | Ex. 2 | Ex. 3 | Ex. 4 |
| Enzyme-decomposed soybean lecithin | 0.3 | 0.3 | 0.3 | 3.5 |
| Quillaia saponin | — | — | — | 4.0 |
| (E) Xanthane gum | 0.2 | 0.15 | 0.2 | 1.0 |
| Guar gum | 0.15 | 0.15 | 0.1 | 1.0 |
| Carrageenan | 0.1 | 0.1 | 0.1 | — |
| Psyllium husk | | | | 5.0 |
| (F) d-α-tocopherol | 0.02 | 0.02 | 0.02 | 0.02 |
| L-ascorbyl stearate | 0.006 | 0.006 | 0.006 | 0.006 |
| (G) Citric acd | 0.01 | 0.01 | 0.01 | 0.01 |
| Phytic acid | 0.008 | 0.008 | 0.008 | 0.008 |
| (H) Sodium L-ascorbate | 0.01 | 0.01 | 0.01 | 0.01 |
| (I) β-thujaplicin | 0.0001 | 0.00008 | 0.0001 | 0.0001 |
| β-cyclodextrin | 0.3 | 0.3 | 0.3 | 0.3 |
| Ethanol | 0.05 | 0.05 | 0.05 | 0.05 |
| (J) Water | 43.3959 | 35.44592 | 28.3459 | 39.6959 |
| Total | 100 | 100 | 100 | 100 |

The meat modifying agents prepared in the above-described Examples 1 to 4 were evaluated in terms of various properties in the following manner.

<Preservation Stability>

150 g of each of the meat modifying agents was put into a respective 200-mL graduated cylinder and stored in an incubator (PERFECT OVEN PS 12 of Tahai Seisakusho Kabushiki Kaisha) at a constant temperature of 37° C. for 14 days. Each sample was evaluated visually in terms of stability (by monitoring whether or not there is a phase separation) at timings of 1 day (24 hours), 3 days (72 hours), 6 days (144 hours), 10 days (240 hours) and 14 days (336 hours). The results are indicated in TABLE 2.

TABLE 2

Storage Stability

| Ex. No. | Stability of Emulsions | | | | |
|---|---|---|---|---|---|
| | After 24 h | After 72 h | After 144 h | After 240 h | After 336 h |
| Ex. 1 | No phase separation Stable | No phase separation Stable | No phase separation Stable | No phase separation Stable | No phase separation Stable |
| Ex. 2 | No phase separation Stable | No phase separation Stable | No phase separation Stable | No phase separation Stable | No phase separation Stable |
| Ex. 3 | No phase separation Stable | No phase separation Stable | No phase separation Stable | No phase separation Stable | No phase separation Stable |
| Ex. 4 | No phase separation Stable | No phase separation Stable | No phase separation Stable | No phase separation Stable | No phase separation Stable |

<Dilution Stability>

55 g of each of the meat modifying agents was diluted with 45 g of purified water, 50 g of each of the meat modifying agents was diluted with 50 g of purified water, and 45 g of each of the meat modifying agents was diluted with 55 g of purified water, thus preparing diluted modifiers (Samples 1-1 to 1-3, Samples 2-1 to 2-3, Samples 3-1 to 3-3 and Samples 4-1 to 4-3). Each of thus obtained meat modifying agent samples was put into a respective 100-mL graduated cylinder and stored for 48 hours at a temperature of 13° C., which is regarded as the optimal temperature in a meat processing factory. Each sample was visually evaluated in terms of stability (by monitoring whether or not there is a phase separation). The results are indicated in TABLE 3.

TABLE 3

Stability Upon Dilution

| Ex. No. | Dilution rate (Emulsion/water ratio) | Stability of emulsion |
|---|---|---|
| Ex. 1-1 | 55/45 | No phase separation Stable |
| Ex. 1-2 | 50/50 | No phase separation Stable |
| Ex. 1-3 | 45/55 | No phase separation Stable |
| Ex. 2-1 | 55/45 | No phase separation Stable |
| Ex. 2-2 | 50/50 | No phase separation Stable |
| Ex. 2-3 | 45/55 | No phase separation Stable |
| Ex. 3-1 | 55/45 | No phase separation Stable |
| Ex. 3-2 | 50/50 | No phase separation Stable |
| Ex. 3-3 | 45/55 | No phase separation Stable |
| Ex. 4-1 | 55/45 | No phase separation Stable |
| Ex. 4-2 | 50/50 | No phase separation Stable |
| Ex. 4-3 | 45/55 | No phase separation Stable |

<Viscosity>

The viscosity of each of the meat modifying agents obtained in the above-described Examples was measured with use of C-type viscometer VCR-20 (having a rotation speed of 20 rpm) of Kabushiki Kaisha Tokyo Keiki Seisakusho. It should be noted that the non-diluted modifier was measured using rotor No. 3 at a temperature of 35° C., and the diluted modifier was measured using rotor No. 0 at a temperature of 25° C. The results are indicated in TABLE 4.

<pH Value>

The pH value of each of the meat modifying agents obtained in the above-described examples was measured with use of glass electrode pH meter HM-20 model of Toa Denpa Kogyo Kabushiki Kaisha, at a temperature of 25° C. The results are also indicated in TABLE 4.

<Diameter of Oil Droplets of Emulsion>

The average diameter of the oil droplets of the meat modifying agents (emulsions) obtained in the above-described examples was measured with use of BHB-331 model microscope (equipped with a micron scaler) (magnification of 600 times) of Olympus Optical Kabushiki Kaisha. The results are also indicated in TABLE 4.

TABEL 4

| Ex. No. | Various Properties | | | |
|---|---|---|---|---|
| | Dilution rate (Emulsion/water ratio) | Viscosity (cP) | pH | Average diameter of droplets (μm) |
| Ex. 1 | Not diluted | 360 | 4.05 | 0.5-2.0 |
| Ex. 1-1 | 55/45 | 60 | 3.95 | 0.5-2.0 |
| Ex. 1-2 | 50/50 | 40 | 4.16 | 0.5-2.0 |
| Ex. 1-3 | 45/55 | 34 | 4.41 | 0.5-2.0 |
| Ex. 2 | Not diluted | 920 | 2.1 | 0.5-2.0 |
| Ex. 2-1 | 55/45 | 53 | 2.44 | 0.5-2.0 |
| Ex. 2-2 | 50/50 | 34 | 2.47 | 0.5-2.0 |
| Ex. 2-3 | 45/55 | 26 | 2.55 | 0.5-2.0 |
| Ex. 3 | Not diluted | 1040 | 2.65 | 0.5-2.0 |
| Ex. 3-1 | 55/45 | 59 | 3.01 | 0.5-2.0 |
| Ex. 3-2 | 50/50 | 35 | 3.06 | 0.5-2.0 |
| Ex. 3-3 | 45/55 | 29 | 3.20 | 0.5-2.0 |
| Ex. 4 | Not diluted | 12250 | 4.00 | 0.5-2.0 |
| Ex. 4-1 | 55/45 | 800 | 5.20 | 0.5-2.0 |
| Ex. 4-2 | 50/50 | 760 | 5.15 | 0.5-2.0 |
| Ex. 4-3 | 45/55 | 526 | 5.27 | 0.5-2.0 |

<Anti-Bacterial Property After Storage>

The meat modifying agents obtained in Examples 1 to 4 described above were stored at 37° C. for 14 days, and then they were subjected to an anti-bacterial test based on the food hygiene inspection guideline. Further, the diluted modifiers, that is, Samples 1-1 to 1-3, Samples 2-1 to 2-3, Samples 3-1 to 3-3 and Samples 4-1 to 4-3 Samples 1, were stored at 13° C. for 48 hours, and then they were subjected to an anti-bacterial test based on the food hygiene inspection guideline. The results are also indicated in TABLE 5.

TABLE 5

| | Results of Antibacterial Test | | |
|---|---|---|---|
| Tested Bacteria | Ex. 1-4 (After stored for 14 days at 37° C.) | Ex. 1-1 to 4-3 (After stored for 48 h at 37° C.) | Test Method |
| Number of general viable bacteria | 300 or less/g | 300 or less/g | Enrichment culture |
| E. coli | Negative | Negative | Enrichment culture |
| Pathogenic E. coli | Negative/2.22 g | Negative/2.22 g | Enrichment culture |
| Staphylococcus aureus | Negative | Negative | Enrichment culture |
| Salmonella | Negative | Negative | Enrichment culture |
| Number of thermoduric bacteria | 300 or less/g | 300 or less/g | Enrichment culture |

EXAMPLE 5

Each of the diluted meat modifying agents, Samples 3-1 to 3-3 and Samples 4-1 to 4-3 was injected into respective pieces of thawed beef striploin meat (1 to 3° C.) imported from Australia at ratios of 15 parts by weight, 18 parts by weight and 20 parts by weight, respectively, at an injection pressure of 2 to 3 kg/m² using an injector (Super Injector SP-500-3 of Kabushiki Kaisha Higashimoto Kikai). Then, the sample-injected meat pieces were processed with a vacuum tumbler (Super Massage 850 model (vacuum massage) of Kabushiki Kaisha Higashimoto Kikai) under a vacuum pressure of –76 kpaG. In this process, a cycle consisting of 5 minutes of rotation in a forward direction and 15 minutes of resting was repeated 6 times so as to promote the modifier samples to flow with pressure into the muscle tissues of the meats as well as the structural pattern of the Cohnheim's structure of the sarcoplasm (colloidal solution). Then, as the orientations of the diluted meat modifying agents become stable, quasi-marbled meats that are similar to naturally marbled meats were obtained. After that, each of the modifier-injected meat pieces was shaped into loins with an enveloping member and quickly frozen at –40° C.

After the completion of the freezing, each piece was freeze-ripened for 4 to 10 days, and was cut into a cookable size, for example, of 200 g, to prepare a quasi-naturally marbled steak meat. Then, the modification into a marbled meat was judged in three steps by the following manner. After that, thus obtained steak meat pieces were cooked by a top-ranking chef and evaluated in terms of the following items.

1) Evaluation on Artificial Marbled Meats a) Each of the obtained pieces was visually evaluated.

The results indicated that all of the modified meats were judged to be similar to naturally marbled meat.

b) An optical evaluation was carried out. More specifically, using a stereoscopic microscope, model S 051 of Olympus Optical Kabushiki Kaisha, each sample was observed at a magnification of 120 times.

The results indicated that all of the modified meats were judged to be as excellent as naturally marbled meat.

c) Another optical evaluation was carried out. More specifically, using a stereoscopic microscope, model BHB-331 (magnification of 600 times) of Olympus Optical Kabushiki Kaisha, each sample was observed.

The results indicated that in each case of the modified meats, it was observed that the emulsion was put with pressure and fixated in the perimysium internum, perimysium externum, cohnheim area between myofibrils that have striation and sacroplasm, and each sample was judged to be similar to naturally marbled meat.

2) Evaluation Items a. Cookability without thawing: each sample was evaluated as to whether it can be easily and quickly cooked without any problem.

◎ . . . There was no problem;

○ . . . There was no particular problem to be pointed out; and

X . . . There was a problem.

b. Whether or not drip leaking out: each sample was observed visually as to whether drip leaks out during cooking and the evaluation was made in the following criteria.

◎ . . . There was no drip observed to leak out;

○ . . . There was slight leakage of drip observed; and

X . . . There was obviously leakage of drip observed.

c. No shrinkage after being roasted: each sample was observed visually in terms of shrinkage of the meat after being roasted and the evaluation was made in the following criteria.

◎ . . . There was no shrinkage observed in the roasted meat;
○ . . . There was slight shrinkage observed in the roasted meat; and
X . . . There was obviously shrinkage observed in the roasted meat.

d. Softness after being cooked: each sample was actually eaten to feel the softness of the meat immediately after being roasted and the evaluation was made in the following criteria.

◎ . . . Excellent in softness;
○ . . . Good in softness; and
X . . . Poor in softness, the meat texture is hard to chew.

e. Softness after cooled down: each sample was actually eaten to feel the softness of the meat after being roasted and then let stand to cool down, and the evaluation was made in the following criteria.

◎ . . . Excellent in softness;
○ . . . Good in softness; and
X . . . Poor in softness, the meat texture is hard to chew.

f. Softness after re-heated: each sample was actually eaten to feel the softness of the meat after being roasted, then let stand to cool down, and further the roasted meat was re-heated, and the evaluation was made in the following criteria.

◎ . . . Excellent in softness;
○ . . . Good in softness; and
X . . . Poor in softness, the meat texture is hard to chew.

g. Smelling property generated while being cooking by roasting: each sample meat was cooked to generate the smell, and the evaluation was made in the following criteria.

◎ . . . Very flavorful smell;
○ . . . Good smell; and
X . . . No good smell.

g. Smelling property generated from raw meat before being cooked: each sample meat was smelled in raw before cooked, and the evaluation was made in the following criteria.

◎ . . . Very flavorful smell;
○ . . . Good smell; and
X . . . No good smell.

The results of the above-evaluations are indicated in TABLES 6 and 7.

TABLE 6

| | Meat Modifier | | | | | | | | |
|---|---|---|---|---|---|---|---|---|---|
| | Ex. 3-1 Injected amount | | | Ex. 3-2 Injected amount | | | Ex. 3-3 Injected amount | | |
| Evaluation Items | 15% | 18% | 20% | 15% | 18% | 20% | 15% | 18% | 20% |
| a: Cookability without thawing | ◎ | ◎ | ◎ | ○ | ◎ | ◎ | ○ | ◎ | ◎ |
| b: Drip leakage | ◎ | ◎ | ◎ | ○ | ◎ | ◎ | ○ | ◎ | ◎ |
| c: Shrinkage upon roasting | ◎ | ◎ | ◎ | ○ | ◎ | ◎ | ○ | ◎ | ◎ |
| d: Softness after cooking | ◎ | ◎ | ◎ | ○ | ◎ | ◎ | ○ | ◎ | ◎ |
| e: Softness after cooled | ◎ | ◎ | ◎ | ○ | ◎ | ◎ | ○ | ◎ | ◎ |
| f: Softness after re-heated | ◎ | ◎ | ◎ | ○ | ◎ | ◎ | ○ | ◎ | ◎ |
| g: Smelling property during cooking | ◎ | ◎ | ◎ | ◎ | ◎ | ◎ | ◎ | ◎ | ◎ |
| h: Smelling property of raw meat before cooked | ◎ | ◎ | ◎ | ◎ | ◎ | ◎ | ◎ | ◎ | ◎ |

TABLE 7

| | Meat Modifier | | | | | | | | |
|---|---|---|---|---|---|---|---|---|---|
| | Ex. 4-1 Injected amount | | | Ex. 4-2 Injected amount | | | Ex. 4-3 Injected amount | | |
| Evaluation Items | 15% | 18% | 20% | 15% | 18% | 20% | 15% | 18% | 20% |
| a: Cookability without thawing | ◎ | ◎ | ◎ | ◎ | ◎ | ◎ | ◎ | ◎ | ◎ |
| b: Drip leakage | ◎ | ◎ | ◎ | ◎ | ◎ | ◎ | ◎ | ◎ | ◎ |
| c: Shrinkage upon roasting | ◎ | ◎ | ◎ | ◎ | ◎ | ◎ | ◎ | ◎ | ◎ |
| d: Softness after cooking | ◎ | ◎ | ◎ | ◎ | ◎ | ◎ | ◎ | ◎ | ◎ |
| e: Softness after cooled | ◎ | ◎ | ◎ | ◎ | ◎ | ◎ | ◎ | ◎ | ◎ |
| f: Softness after re-heated | ◎ | ◎ | ◎ | ◎ | ◎ | ◎ | ◎ | ◎ | ◎ |
| g: Smelling property during cooking | ◎ | ◎ | ◎ | ◎ | ◎ | ◎ | ◎ | ◎ | ◎ |
| h: Smelling property of raw meat before cooked | ◎ | ◎ | ◎ | ◎ | ◎ | ◎ | ◎ | ◎ | ◎ |

EXAMPLE 6

A total of 18 kinds of modified Australian beef striploin meats obtained in Example 5 and a chilled striploin (as a cooking standard) were cooked by two top-ranking chefs, two housewives, two female junior high school students and two middle aged men, and the sample meats were evaluated in terms of the items described below.

The roasting plate used to cook the samples was a copper plate having a thickness of 12 mm, a length of 100 mm and a width of 55 cm. The fuel used was propane gas and a professional-use gas burner was used. From each type of meat samples, two pieces were taken and therefore there were 36 pieces of sample striploin meats in total, and each sample had a weight of 150 g. The roasting time was 6 minutes (4.2 for a bottom surface and 1.8 minutes for a top surface) for each sample. As seasoning, salt and pepper were used.

<Evaluation Items>

Roasting Technique: Whether or not a different technique is required to roast the modified meat samples of the present invention from that of the reference chilled meat was evaluated in terms of the following criteria.

◎ . . . No different roasting technique is required;
α . . . A slightly different roasting technique is required; and
X . . . A very different technique roasting technique is required.

Heat Calorie Required in Roasting: Whether or not there is a difference in required heat calorie between the modified meat samples of the present invention and the reference chilled meat was evaluated in terms of the following criteria.

◎ . . . There is no difference in the heat calorie required to roast the meat;
○ . . . There is a slight difference in the heat calorie required to roast the meat; and
X . . . There is a great difference in the heat calorie required to roast the meat.

Roasting Time: Whether or not there is a difference in the cooked state after roasting the meat for 6 minutes between the modified meat samples of the present invention and the reference chilled meat was evaluated in terms of the following criteria.

◎ . . . There is no difference in the cooked state of the meat;
○ . . . There is a slight difference in the cooked state of the meat; and
X . . . There is a significant difference in the cooked state of the meat.

The results of the evaluations are indicated in TABLE 8.

TABLE 8

| Panelists | Roasting technique | Heat calorie required for roasting | Roasting time |
|---|---|---|---|
| Top-ranking chefs | ◎ | ○ | ○ |
| Housewives | ◎ | ○ | ◎ |
| Female junior high school students | ◎ | ○ | ◎ |
| Middle aged men | ◎ | ○ | ◎ |

Further, the items a to f described above and the convenience and hygiene in cooking (h) were evaluated collectively. The convenience and hygiene in cooking were evaluated in terms of the following criteria.

☆ . . . In view of the convenience and hygiene in cooking, it is expected that the present invention will make our future lives richer.
◎ . . . The modified meat samples according to the present invention are extremely convenient and hygienic in cooking;
○ . . . The modified meat samples according to the present invention are highly convenient and hygienic in cooking;
Δ . . . The modified meat samples according to the present invention are not very convenient and hygienic in cooking; and
X . . . The modified meat samples according to the present invention are not at all convenient and hygienic in cooking.

Further, the participants of the above-described cooking test and 10 housewives servings as additional panelists were asked to actually eat the roasted meat samples and the flavor and taste (i) were evaluated in terms of the following criteria.

☆ . . . In view of the flavor and taste, it is expected that the present invention will make our future lives richer.
◎ . . . The modified meat samples according to the present invention are extremely flavorful and tasty;
○ . . . The modified meat samples according to the present invention are highly flavorful and tasty;
Δ . . . The modified meat samples according to the present invention are not very much flavorful and tasty; and
X . . . The modified meat samples according to the present invention are not at all flavorful and tasty.

The results of the evaluations are indicated in TABLE 9.

TABLE 9

| | Panelists | | | | | | | | | |
|---|---|---|---|---|---|---|---|---|---|---|
| | Participants of cooking tests | | | | | | | | | |
| | Top-ranking chefs | | Housewives | | Female junior high school students | | Middle aged men | | 10 Housewives | |
| Evaluation Items | C | M | C | M | C | M | C | M | C | M |
| a: Cookability without thawing | X | ◎ | X | ◎ | X | ◎ | X | ◎ | — | — |
| b: Drip leakage | Δ | ◎ | Δ | ◎ | Δ | ◎ | Δ | ◎ | — | — |
| c: Shrinkage upon roasting | X | ○ | X | ○ | X | ○ | X | ○ | — | — |
| d: Softness after cooking | X | ○ | X | ○ | X | ○ | X | ○ | — | — |
| e: Softness after cooled | X | ◎ | X | ◎ | X | ◎ | X | ◎ | — | — |
| f: Softness after re-heated | X | ○ | X | ○ | X | ○ | X | ○ | — | — |
| h: Convenience and hygiene in cooking | X | ◎ | X | ☆ | X | ☆ | X | ☆ | X | ☆ |
| i: Flavor, taste | ○ | ○ | X | ☆ | X | ☆ | X | ☆ | X | ☆ |

Note:
C . . . Chilled meat;
M . . . Modified meat of the invention

As the above-provided results indicate, the frozen modified meat product according to the present invention can be cooked without having to thaw it, and substantially no drip leaks out from the meat product or the meat product does not shrink if it is cooked. Further, the modified meat product of the present invention has not only an excellent property in the softness of the meat texture when it is cooked by roasting, but also it retains the softness even when it cools down as being let stand after it was cooked. Furthermore, when the meat is heated once again after cooled down, a sufficient softness of the meat texture can be assured.

As described above, according to the present invention, there is provided a meat modifying agent that can produce a modified meat product that exhibits an appearance, flavor and mouthfeel similar to those of naturally marbled meat, not only before but also after it is cooked, which also has an excellent cooking property without being thawed. The modified meat product that contains the meat modifying agent, even after it is frozen, can be cooked without having to thaw it. Further, the meat product has an excellent property in the softness of the meat and substantially no drip leaks out during the cooking.

Various examples of the present invention were described above; however, the present invention is not limited to these examples, but it is alternatively possible to combine various examples of the invention together.

What is claimed is:

1. A meat modifying agent comprising an oil-in-water emulsion containing: (A) 10 to 60 parts by weight of an animal fat/oil; (B) 0.01 to 1 part by weight of a starch; (C) 15 to 40 parts by weight of a saccharified starch; (D) 0.3 to 8.0 parts by weight of a non-ionic surfactant; (E) 0.41 to 7.5 parts by weight of a viscosity-increasing polysaccharide; (F) 0.02 to 0.05 parts by weight of an anti-oxidant; (G) 0.03 to 0.1 parts by weight of a metal sequestering agent; (H) 0.005 to 0.5 parts by weight of a pH adjusting agent; (I) a preservative containing 0.00001 to 0.005 parts by weight of thujaplicin; and (J) water.

2. The meat modifying agent according to claim 1, wherein oil droplets in the emulsion has an average diameter of 0.5 to 5 μm.

3. The meat modifying agent according to claim 1, wherein the water (J) is contained in an amount of 25 to 45 parts by weight.

4. The meat modifying agent according to claim 1, wherein the thujaplicin is included in a form of an ethanol solution in cyclodextrin.

5. The meat modifying agent according to claim 4, wherein the ethanol is contained in an amount of 0.01 to 1 part by weight, and the cyclodextrin is contained in an amount of 0.3 to 3 parts by weight.

6. The meat modifying agent according to claim 5, wherein the animal fat/oil (A), the starch (B), the saccharified starch (C), the non-ionic surfactant (D), the viscosity-increasing polysaccharide (E), the anti-oxidant (F), the metal sequestering agent (G), the pH adjusting agent (H), the thujaplicin, the water (J), the ethanol and the cyclodextrin are each contained in such an amount that the total amount of these components becomes 100 parts by weight.

7. The meat modifying agent according to claim 6, wherein the meat modifying agent is diluted with additional water.

8. A method of producing a quasi-naturally marbled meat product, comprising injecting the meat modifying agent of claim 1 into meat; and subjecting the meat to a tumbling treatment.

9. The producing method according to claim 8, wherein the meat modifying agent is injected in an amount of 12 to 20 parts by weight with respect to 100 parts by weight of meat.

10. The producing method according to claim 8, further comprising freezing the meat after the tumbling treatment.

11. A meat product characterized by containing the meat modifying agent according to claim 1.

12. The meat product according to claim 11, characterized in that it is in a frozen state.

* * * * *